UNITED STATES PATENT OFFICE.

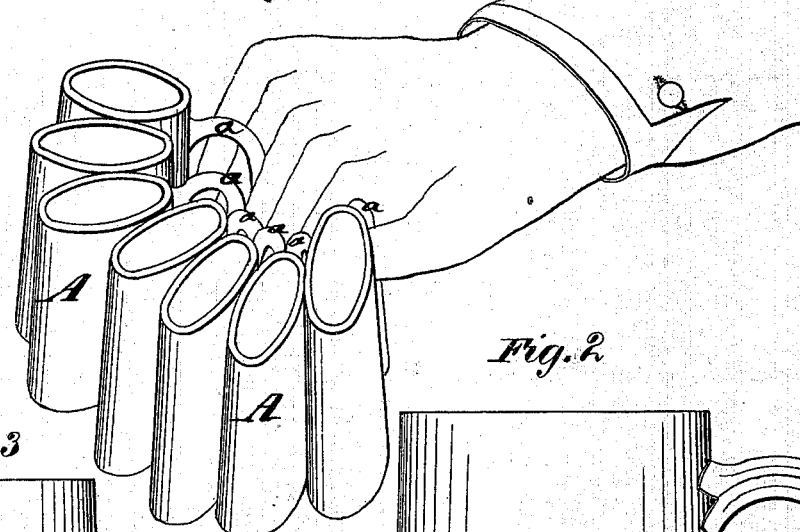
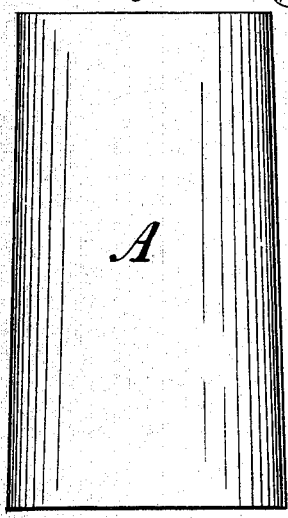
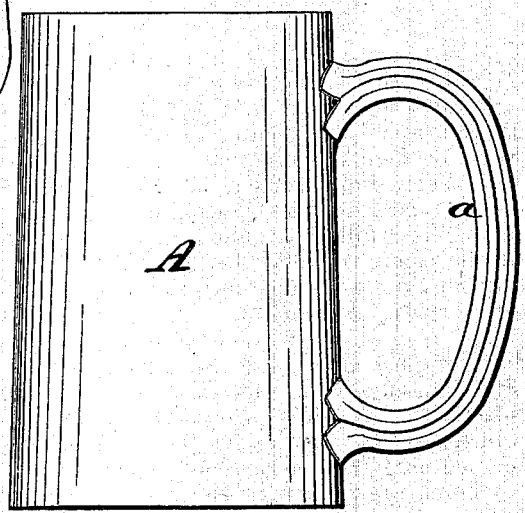
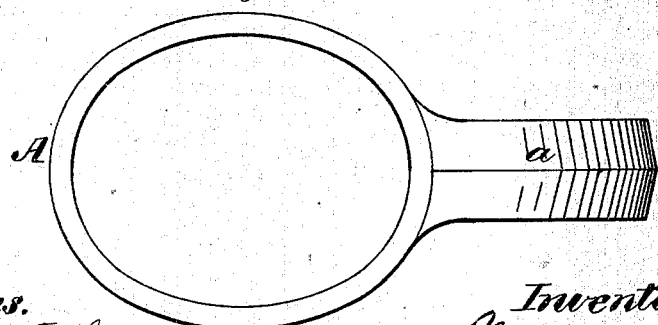

WILLIAM C. KING, OF PITTSBURG, PENNSYLVANIA.

IMPROVEMENT IN BEER-MUGS.

Specification forming part of Letters Patent No. 146,078, dated December 30, 1873; application filed September 5, 1873.

*To all whom it may concern:*

Be it known that I, WILLIAM C. KING, of Pittsburg, in the county of Allegheny and State of Pennsylvania, have invented a new and useful Improvement in Beer Glasses or Mugs; and I do hereby declare that the following is a full, clear, and exact description of the same, reference being had to the accompanying drawings forming part of this specification, in which—

Figure 1 is a top view, showing the new form of glass mug. Fig. 2 is a side view, and Fig. 3 an edge view, thereof. Fig. 4 is a perspective view, illustrating the manner in which a great number of flattened or oval-shaped mugs can be carried in one hand.

The nature of my invention consists in a new article of manufacture, of glass or other analogous ware, viz., a beer-mug, or other similar drinking glass or cup, with a handle, and of an oval or elliptical form in horizontal section.

The beer-mug A, as represented in the drawing, is made of glass pressed, in the usual manner, in a mold. The form may be slightly varied; for instance, the part which is above the base may be oval, and the base portion circular. In a word, my invention includes the giving an oval or elliptical form to any portion of the mug, or the whole of such mug. The best form, however, is the one represented. The handle *a* is on one of the smallest or narrowest sides of the mug. The mug shown has the advantage of other known mugs in this: First, more of them can be carried at one time in the hand, from the fact that the flattened sides, when adjoining one another, permit the handles to be brought closer together than is practicable with circular mugs; second, being broad and having a narrow space between its sides, it shows the clearness of the beer throughout, and, in addition, the eye can take in view a larger quantity from one position than is the case with mugs which are circular; third, the form of the mouth or discharging end is much better adapted to the human mouth, and the beer can be more effectually concentrated and controlled than with mugs which are circular.

Having described my invention, what I claim as new, and desire to secure by Letters Patent, is—

The new article of manufacture, of glass or other analogous ware, to wit, a beer-mug which is of oval or elliptical form in its horizontal section, and has its handle on one of its narrowest sides, or at right angles to its smallest diameter, as herein set forth.

WM. C. KING.

Witnesses:
H. HARRISON,
W. DWIGHT BELL.